(12) United States Patent
Li et al.

(10) Patent No.: US 11,055,804 B2
(45) Date of Patent: Jul. 6, 2021

(54) HEARTBEAT CONTROL SYSTEM FOR SHARED BICYCLES

(71) Applicant: HANGZHOU QINGQI SCIENCE AND TECHNOLOGY CO., LTD., Zhejiang (CN)

(72) Inventors: Gang Li, Hangzhou (CN); Guotai He, Hangzhou (CN); Meimiao Feng, Hangzhou (CN); Shenghong Cai, Hangzhou (CN); Sheng Liu, Hangzhou (CN)

(73) Assignee: HANGZHOU QINGQI SCIENCE AND TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/784,442

(22) Filed: Feb. 7, 2020

(65) Prior Publication Data
US 2020/0175637 A1 Jun. 4, 2020

Related U.S. Application Data

(63) Continuation of application No. PCT/CN2018/090049, filed on Jun. 6, 2018.

(30) Foreign Application Priority Data

Aug. 7, 2017 (CN) .................. 201710667517.X
Feb. 6, 2018 (CN) .................. 201810119770.6

(51) Int. Cl.
*G06Q 30/02* (2012.01)
*G06Q 50/30* (2012.01)
(Continued)

(52) U.S. Cl.
CPC .............. *G06Q 50/30* (2013.01); *G01S 19/06* (2013.01); *G06Q 30/0645* (2013.01);
(Continued)

(58) Field of Classification Search
CPC .............. G06Q 10/02; G06Q 2240/00; G06Q 30/0645; E05B 71/00; G07B 15/00; Y02D 30/00; G07C 9/00182
(Continued)

(56) References Cited

U.S. PATENT DOCUMENTS 8,249,807 B1 8/2012 Barbeau et al.
9,666,073 B1 * 5/2017 Lin .................. G06Q 10/06
(Continued)

FOREIGN PATENT DOCUMENTS

CN 104468187 A * 3/2015
CN 104468187 A   3/2015
(Continued)

OTHER PUBLICATIONS

"Caltrain Bicycle Access and Parking Plan: Implementation Strategy", Dec. 2014, Caltrain.com, 16 pgs (Year: 2014).*
(Continued)

*Primary Examiner* — Shannon S Campbell
*Assistant Examiner* — Freda A Nelson
(74) *Attorney, Agent, or Firm* — Metis IP LLC

(57) ABSTRACT

The present disclosure relates to the field of shared bicycles, and particularly relates to a heartbeat control system for shared bicycles. The heartbeat control system may include a server configured to divide an area that includes the shared bicycles into a plurality of parking zones based on a virtual map and determine an off-peak period and a peak period of each of the plurality of parking zones, and a lock control device mounted on one of the shared bicycles. The lock control device may include a network module that is periodically actuated by the lock control device. The lock control device may be configured to obtain, based on a parking zone of the shared bicycle, an off-peak period and
(Continued)

a peak period corresponding to the parking zone, and extend an actuation frequency during the off-peak period.

20 Claims, 2 Drawing Sheets

(51) Int. Cl.
    *G01S 19/06*     (2010.01)
    *G06Q 30/06*     (2012.01)
    *G07C 9/00*     (2020.01)
    *H04L 29/08*     (2006.01)

(52) U.S. Cl.
    CPC ........ *G07C 9/00182* (2013.01); *H04L 67/125* (2013.01); *G07C 2009/0019* (2013.01)

(58) Field of Classification Search
    USPC .............................. 705/5, 13, 307; 340/5.61
    See application file for complete search history.

(56) References Cited

U.S. PATENT DOCUMENTS

| | | |
|---|---|---|
| 2015/0179008 A1 | 6/2015 | Sung et al. |
| 2018/0018840 A1 | 1/2018 | Xia et al. |

FOREIGN PATENT DOCUMENTS

| | | |
|---|---|---|
| CN | 104853050 A | 8/2015 |
| CN | 106251497 A | 12/2016 |
| CN | 106385467 A | 2/2017 |
| CN | 206115535 U | 4/2017 |
| CN | 106828674 A | 6/2017 |
| CN | 106973361 A | 7/2017 |
| JP | 2013025589 A | 2/2013 |
| JP | 2015060452 A | 3/2015 |
| WO | WO-2018176872 A1 * 10/2018 ............. G08G 1/205 |

OTHER PUBLICATIONS

Extended European Search Report in European Application No. 18845003.5 dated Jun. 2, 2020, 8 pages.
International Search Report in PCT/CN2018/090049 dated Aug. 6, 2018, 5 pages.
Written Opinion in PCT/CN2018/090049 dated Aug. 6, 2018, 7 pages.
First Office Action in Chinese Application No. 201810119770.6 dated Nov. 28, 2019, 16 pages.

* cited by examiner

HEARTBEAT CONTROL SYSTEM FOR SHARED BICYCLES

CROSS-REFERENCE TO RELATED APPLICATIONS

This application is a Continuation of International Application No. PCT/CN2018/090049, filed on Jun. 6, 2018, which claims priority of Chinese Patent Application No. 201810119770.6, filed on Feb. 6, 2018, and Chinese Patent Application No. 201710667517.X, filed on Aug. 7, 2017, the contents of each of which are hereby incorporated by reference.

TECHNICAL FIELD

The present disclosure generally relates to the field of shared bicycles, and more particularly, relates to a heartbeat control system of a shared bicycle.

BACKGROUND

With the development of the Internet era, shared vehicles, such as shared bicycles and shared cars, have gained rapid popularity. The shared vehicles may meet the general travel needs of ordinary people, and have been widely welcomed by the people, played an increasingly important role in the lives of the people.

However, for the emerging shared vehicles, especially the shared bicycles, most of them use electronic locks with related network functions, alarm functions, etc., which consume a lot of power. Although a solar charging board may be used as a charging power source to solve the power problem, charging may still be a very big problem in some places that cannot be exposed to the sun or on cloudy days. Therefore, the electric quantity has always been one of the important factors that restricts the development of the shared bicycles.

In terms of power consumption of a shared bicycle, the network function may be the largest power consumer. Especially, it is necessary to periodically start a network module of the shared bicycle to ensure a constant connection of the network module. However, with the development of technology or program optimization, the optimal actuation frequency of the network module may be constantly changed and constantly optimized. Reducing the actuation frequency may lead to a significant reduction in power consumption, which is one of the issues that the management party has been focused on.

SUMMARY

The technical problem to be solved by the present disclosure is to provide a heartbeat control system for shared bicycles in response to the above-mentioned shortcomings of the prior art, thereby solving the problem of large power consumption.

The technical solution for the technical problem is providing a heartbeat control system for shared bicycles.

The heartbeat control system may include a server configured to divide an area that includes the shared bicycles into a plurality of parking zones based on a virtual map, obtain a usage state of each shared bicycle in each of the plurality of parking zones during a time period, and determine an off-peak period and a peak period of each of the plurality of parking zones.

The heartbeat control system may also include a lock control device mounted on one of the shared bicycles. The lock control device may include a network module that is periodically actuated by the lock control device. The lock control device may obtain, based on a parking zone of the shared bicycle, an off-peak period and a peak period corresponding to the parking zone. The lock control device may extend an actuation frequency during the off-peak period.

In some embodiments, the lock control device may include a positioning module configured to periodically upload location information to the server. The server may divide, based on the location information, the shared bicycle to the corresponding parking zone. The server may send the off-peak period and the peak period corresponding to the parking zone to the lock control device.

In some embodiments, the positioning module may include a GPS module or a GPRS module.

In some embodiments, the heartbeat control system may include a mobile terminal. The shared bicycle may upload location information to the server via the mobile terminal when a lock of the shared bicycle is locked. The server may divide, based on the location information, the shared bicycle to the corresponding parking zone. The server may send the off-peak period and the peak period corresponding to the parking zone to the lock control device.

In some embodiments, the network module may include a communication connection module. The lock control device may periodically actuate the communication connection module. The communication connection module may realize a communication connection with the server.

In some embodiments, the network module may be a mobile communication module.

In some embodiments, the mobile communication module may be a 2G communication module, or a 3G communication module, or a 4G communication module.

In some embodiments, the usage state of each shared bicycle may include an actuation status of a lock control device of the shared bicycle.

In some embodiments, the lock control device may control a periodic actuation frequency of the network module to be 5-10 minutes during the peak period, and control a periodic actuation frequency of the network module to be 1-2 hours during the off-peak period.

In some embodiments, the server may further include an updating module. The updating module may obtain a usage state of each shared bicycle in each of the plurality of parking zones in a current day. The updating module may determine an updated off-peak period and an updated peak period corresponding to the parking zone in combination with historical usage state information.

The beneficial effect of the present disclosure includes that, compared with the prior art, the present disclosure provides a heartbeat control system. The system may determine an off-peak period and a peak period corresponding to each parking zone, and adjust the periodic actuation of a network module of each shared bicycle in the parking zone, which may optimize the resource structure, reduce the power consumption more efficiently without reducing the user experience.

BRIEF DESCRIPTION OF THE DRAWINGS

The present disclosure is further described in terms of exemplary drawings and embodiments, and wherein.

DETAILED DESCRIPTION

Some embodiments of the present disclosure may be described in detail in combination with the accompanying drawings.

Figure 1:
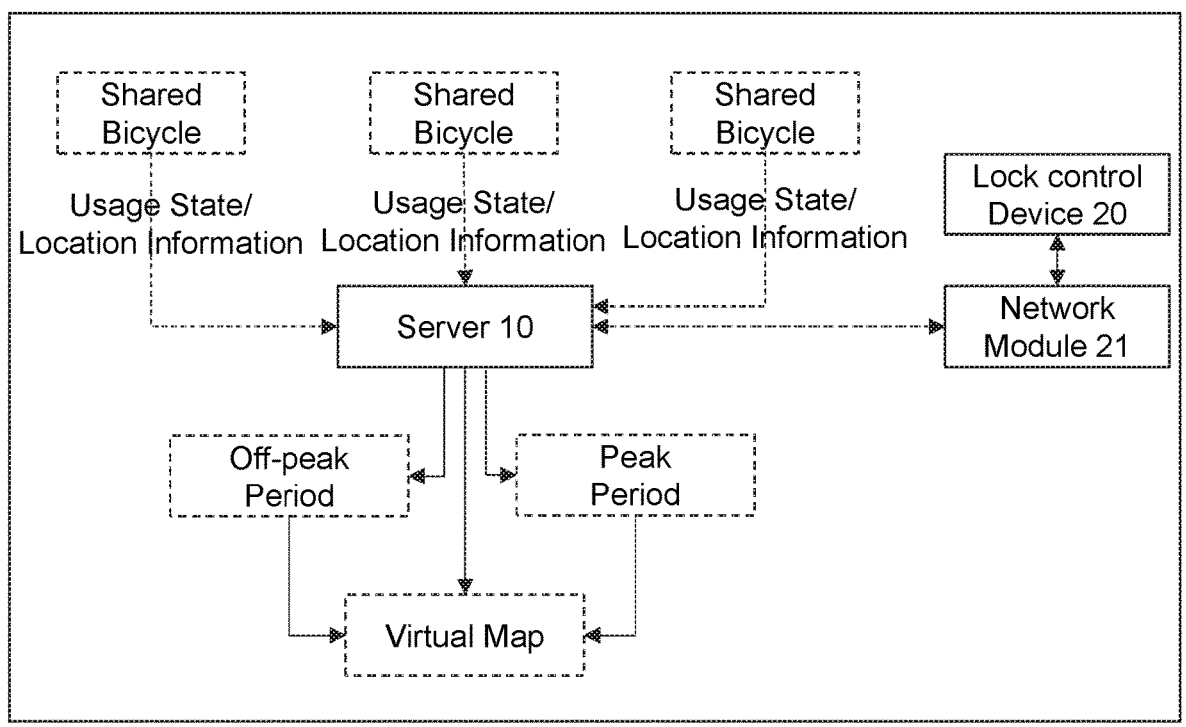
FIG. 1 is a schematic diagram illustrating an exemplary heartbeat control system according to s the present disclosure.

As shown in FIG. 1, a schematic diagram illustrating an exemplary heartbeat control system for shared bicycles is provided according to some embodiments of the present disclosure.

The heartbeat control system may include a server 10 and a lock control device 20. The server 10 may divide an area that includes the shared bicycles into a plurality of parking zones based on a virtual map. The server 10 may obtain a usage state of each shared bicycle in each of the plurality of parking zones during a time period. The server 10 may determine an off-peak period and a peak period of each of the plurality of parking zones. The lock control device may be mounted on one of the shared bicycles. The lock control device 20 may include a network module 21 that is periodically actuated by the lock control device 20. Based on a parking zone of the shared bicycle, the lock control device 20 may obtain an off-peak period and a peak period corresponding to the parking zone. The lock control device 20 may extend an actuation frequency during the off-peak period.

Specifically, when the server 10 divides the plurality of parking zones based on the virtual map, a street or a district (which may refer to map naming rules) may be designated as a parking zone of the plurality of parking zones. Due to user distributions or regional supports are different in such as commercial areas, residential areas, etc., the using time of shared bicycles may be different. Almost no one may use shared bicycles after 10 p.m. in some cities and districts, while many people may use shared bikes at 12 p.m. in some other cities and districts. Data may be collected continuously, generally once a day. Each data group may include a usage count, and a time length, distance, time, and other data of each usage corresponding to the usage count. In combination with historical collected data, a large database may be formed for effective analysis to determine the off-peak period and the peak period corresponding to each of the plurality of parking zones. The usage state of each shared bicycle may include an actuation status of a lock control device 20 of each shared bicycle.

After a shared bicycle enters a corresponding parking zone, a lock control device 20 of the shared bicycle may obtain an off-peak period and a peak period corresponding to the parking zone transmitted from the server 10. The lock control device 20 may control the network module 21 to be periodically actuated in a normal frequency during the peak period, and appropriately extend an actuation frequency during the off-peak period. Preferably, the lock control device 20 may control the periodic actuation frequency of the network module 21 to be 5-10 minutes during the peak period, and control a periodic actuation frequency of the network module 21 to be 1-2 hours during the non-peak period.

In some embodiments, the network module 21 may include a communication connection module. The lock control device 20 may periodically actuate the communication connection module. The communication connection module may realize a communication connection with the server 10.

Further, the network module 21 may be a mobile communication module. Preferably, the mobile communication module may be a 2G communication module, or a 3G communication module, or a 4G communication module.

In some embodiments, the server 10 may further include an updating module. The updating module may obtain a usage state of each shared bicycle in each of the plurality of parking zones in a current day. The updating module may determine an updated off-peak period and an updated peak period corresponding to the parking zone in combination with historical usage state information.

Figure 2:
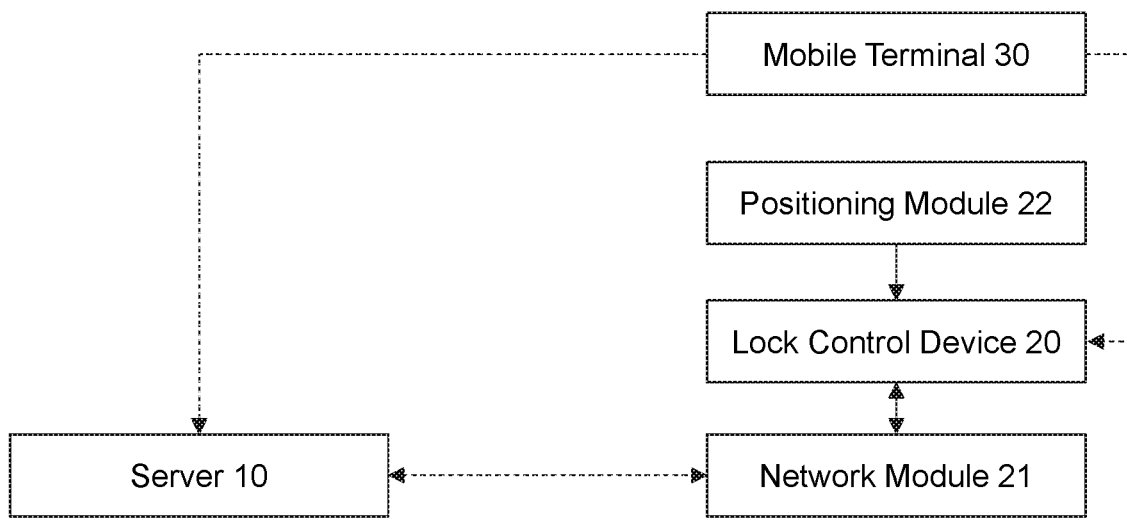
FIG. 2 is a schematic diagram illustrating an exemplary positioning manner according to the present disclosure.

As shown in FIG. 2, an exemplary positioning manner is provided according to some embodiments of the present disclosure.

Two embodiments are provided in the present disclosure,

Embodiment 1

The lock control device 20 may include a positioning module 22. The positioning module 22 may periodically upload location information to the server 10. The server 10 may divide the shared bicycle to the corresponding parking zone based on the location information. The server 10 may send the off-peak period and the peak period corresponding to the parking zone to the lock control device 20.

Further, the positioning module 22 may include a GPS module or a GPRS module.

Embodiment 2

The heartbeat control system may include a mobile terminal 30. The shared bicycle may upload location information to the server 10 via the mobile terminal 30 when a lock of the shared bicycle is locked. The server 10 may divide the shared bicycle to the corresponding parking zone based on the location information. The server 10 may send the off-peak period and the peak period corresponding to the parking zone to the lock control device 20.

The above is only some embodiments of the present disclosure, and is not intended to limit the scope of the present disclosure. Any equivalent variations or modifications made in accordance with the scope of the patent application for the present disclosure are covered by the present disclosure.

We claim:

1. A heartbeat control system for shared bicycles, comprising: a server configured to:
   divide, based on a virtual map, an area that includes the shared bicycles into a plurality of parking zones;
   obtain a usage state of each shared bicycle in each of the plurality of parking zones during a time period; and
   determine an off-peak period and a peak period of each of the plurality of parking zones; and
   a lock control device mounted on one of the shared bicycles, wherein the lock control device includes a network module that is periodically actuated by the lock control device, and the lock control device is configured to:
   obtain, based on a parking zone of the shared bicycle, an off-peak period and a peak period corresponding to the parking zone;
   extend an actuation frequency of the network module during the off-peak period± wherein the lock control device includes a positioning module configured to periodically upload location information to the server, and the server is further configured to:

divide, based on the location information, the shared bicycle to the corresponding parking zone; and
send the off-peak period and the peak period corresponding to the parking zone to the lock control device.

2. The heartbeat control system of claim 1, wherein the positioning module includes a GPS module or a GPRS module.

3. The heartbeat control system of claim 1, comprising a mobile terminal, wherein:
the shared bicycle uploads location information to the server via the mobile terminal when a lock of the shared bicycle is locked, and the server is configured to:
divide, based on the location information, the shared bicycle to the corresponding parking zone, and
send the off-peak period and the peak period corresponding to the parking zone to the lock control device.

4. The heartbeat control system of claim 1, wherein: the network module includes a communication connection module,
the lock control device is configured to periodically actuate the communication connection module, and
the communication connection module is configured to realize a communication connection with the server.

5. The heartbeat control system of claim 4, wherein the network module is a mobile communication module.

6. The heartbeat control system of claim 5, wherein the mobile communication module includes at least one of a 2G communication module, a 3G communication module, or a 4G communication module.

7. The heartbeat control system of claim 1, wherein the usage state of each shared bicycle includes an actuation status of a lock control device of the shared bicycle.

8. The heartbeat control system of claim 1, wherein the lock control device is configured to:
control a periodic actuation frequency of the network module to be 5-10 minutes during the peak period, and
control a periodic actuation frequency of the network module to be 1-2 hours during the off-peak period.

9. The heartbeat control system of claim 1, wherein the server further includes an updating module, and the updating module is configured to:
obtain a usage state of each shared bicycle in each of the plurality of parking zones in a current day, and
determine an updated off-peak period and an updated peak period corresponding to the parking zone in combination with historical usage state information.

10. A method for heartbeat controlling a shared bicycle, the shared bicycle including a lock control device that periodically actuates a network module included therein and the lock control device communicates with a server, the method comprising:
dividing, by the server, based on a virtual map, an area that includes the shared bicycles into a plurality of parking zones;
obtaining, by the server, a usage state of each shared bicycle in each of the plurality of parking zones during a time period;
determining, by the server, an off-peak period and a peak period of each of the plurality of parking zones;
obtaining, by the lock control device, based on a parking zone of the shared bicycle, the off-peak period and the peak period corresponding to the parking zone;
extending, by the lock control device, an actuation frequency of the network module during the off-peak period;
periodically uploading, by a positioning module included in the lock control device, location information to the server;
dividing, by the server, based on the location information, the shared bicycle to the corresponding parking zone; and
sending, by the server, the off-peak period and the peak period corresponding to the parking zone to the lock control device.

11. The method of claim 10, wherein the positioning module includes a GPS module or a GPRS module.

12. The method of claim 10, wherein the shared bicycle includes a mobile terminal, the shared bicycle uploads location information to the server via the mobile terminal when a lock of the shared bicycle is locked.

13. The method of claim 10, wherein:
the network module includes a communication connection module, the lock control device is configured to periodically actuate the communication connection module, and the communication connection module is configured to realize a communication connection with the server.

14. The method of claim 13, wherein the network module is a mobile communication module.

15. The method of claim 14, wherein the mobile communication module includes at least one of a 2G communication module, a 3G communication module, or a 4G communication module.

16. The method of claim 10, wherein the usage state of each shared bicycle includes an actuation status of the lock control device of the shared bicycle.

17. The method of claim 10, wherein the server is further configured to:
obtain a usage state of each shared bicycle in the parking zone in a current day, and determine an updated off-peak period and an updated peak period corresponding to the parking zone in combination with historical usage state information.

18. The method of claim 10, wherein the extending an actuation frequency during the off-peak period includes:
controlling a periodic actuation frequency of the network module to be 5-10 minutes during the peak period, or
controlling a periodic actuation frequency of the network module to be 1-2 hours during the off-peak period.

19. A lock control device of a shared bicycle, comprising:
a network module that is periodically actuated by the lock control device configured to communicate with a server, and wherein the server is configured to:
divide, based on a virtual map, an area that includes the shared bicycles into a plurality of parking zones;
obtain a usage state of each shared bicycle in each of the plurality of parking zones during a time period;
determine an off-peak period and a peak period of each of the plurality of parking zones; and the lock control device is configured to:
obtain, based on a parking zone of the shared bicycle, the off-peak period and the peak period corresponding to the parking zone;
extend an actuation frequency of the network module during the off-peak period; a positioning module configured to periodically upload location information to the server, wherein the server is further configured to:
divide, based on the location information, the shared bicycle to the corresponding parking zone; and
send the off-peak period and the peak period corresponding to the parking zone to the lock control device.

20. The lock control device of claim 19, comprising: a mobile terminal, wherein:
  the shared bicycle uploads location information to the server via the mobile terminal when a lock of the shared bicycle is locked, and the server is configured to:
  divide, based on the location information, the shared bicycle to the corresponding parking zone, and
  send the off-peak period and the peak period corresponding to the parking zone to the lock control device.

* * * * *